US00RE48921E

(19) United States
(12) Reissued Patent
Jensen

(10) Patent Number: US RE48,921 E
(45) Date of Reissued Patent: Feb. 1, 2022

(54) AUDIO DEVICE COMPRISING A MICROPHONE

(71) Applicant: OTICON A/S, Smørum (DK)

(72) Inventor: Lars Tuborg Jensen, Smørum (DK)

(73) Assignee: OTICON A/S, Smørum (DK)

(21) Appl. No.: 16/445,037

(22) Filed: Jun. 18, 2019

Related U.S. Patent Documents

Reissue of:
(64) Patent No.: 8,494,204
Issued: Jul. 23, 2013
Appl. No.: 13/013,610
Filed: Jan. 25, 2011

U.S. Applications:
(63) Continuation of application No. 11/515,802, filed on Sep. 6, 2006, now Pat. No. 7,894,621.

(30) Foreign Application Priority Data

Sep. 8, 2005 (EP) ..... 05108252

(51) Int. Cl.
*H04R 9/08* (2006.01)
*H04R 25/00* (2006.01)
*H04R 1/08* (2006.01)

(52) U.S. Cl.
CPC ..... *H04R 1/086* (2013.01); *H04R 25/402* (2013.01); *H04R 2205/041* (2013.01); *H04R 2410/07* (2013.01)

(58) Field of Classification Search
CPC ..... H04R 1/086; H04R 2410/07; H04R 2205/041; H04R 25/402
See application file for complete search history.

(56) References Cited

U.S. PATENT DOCUMENTS 1,664,852 A 4/1928 Dodge
6,069,963 A * 5/2000 Martin ..... H04R 25/405 381/313

(Continued)

FOREIGN PATENT DOCUMENTS

EP 1 349 426 A2 10/2003
EP 1 397 023 A2 3/2004

(Continued)

OTHER PUBLICATIONS

U.S. Appl. No. 60/366,005, filed Mar. 20, 2002, Saltykov.

(Continued)

*Primary Examiner* — Colin M LaRose
(74) *Attorney, Agent, or Firm* — Birch, Stewart, Kolasch & Birch, LLP

(57) ABSTRACT

An audio device includes a microphone, a sound canal allowing sound to pass from the surroundings to the microphone, a signal path from the microphone to a receiver, and a current source, such that sounds received at the microphone may be enhanced and presented at the ear level of the user. A protection screen is provided at the sound canal, and includes a first surface which faces the surroundings and a second surface which faces the sound canal, and defines a slit-formed opening between the first surface and the second surface. The curvature between the first surface and the slit-formed opening is smooth and gradual, and a sharp edge is located at the transition between the second surface and the slit-formed opening.

7 Claims, 4 Drawing Sheets

(56) References Cited

U.S. PATENT DOCUMENTS

| | | | | |
|---|---|---|---|---|
| 6,091,830 | A | 7/2000 | Toki | |
| 6,522,764 | B1 * | 2/2003 | Bøgeskov-Jensen | H04R 25/60 381/330 |
| 6,546,111 | B2 * | 4/2003 | Stede | H04R 25/65 381/330 |
| 6,574,343 | B1 * | 6/2003 | Meier | H04R 25/65 381/322 |
| 6,735,319 | B1 * | 5/2004 | Vonlanthen | H04R 25/60 381/322 |
| 7,013,014 | B2 * | 3/2006 | Ach-Kowalewski | H04R 25/405 381/313 |
| 7,245,733 | B2 | 7/2007 | Saltykov | |
| 2004/0170293 | A1 * | 9/2004 | Watson et al. | 381/359 |
| 2007/0127757 | A2 * | 6/2007 | Darbut | H04R 25/65 381/330 |

FOREIGN PATENT DOCUMENTS

| | | | | |
|---|---|---|---|---|
| JP | 10-285259 | | 10/1998 | |
| WO | WO 00/41432 | | 7/2000 | |
| WO | WO 2005/055653 | * | 6/2005 | H04R 25/00 |

OTHER PUBLICATIONS

Declaration of Dr. Wayne J. Staab, Ph.D dated Aug. 9, 2017 filed in IPR2017-01927, pp. 1-103.

Final Written Decision dated Feb. 21, 2019, issued in IPR2017-01927, paper 40, pp. 1-52.

Mundel, A.B. and Carlisle, R. W., "Broadened Criteria of Hearing Aid Performance," J. of the Acoustical Soc. of Am., vol. 19, No. 4 Jul. 1947.

Reply Declaration of Dr. Wayne J. Staab, Ph.D. dated Sep. 10, 2018, filed in IPR2017-01927, pp. 1-24.

Ricketts, T.A., "Direction Hearing Aids", Trends in Amplification, vol. 5, No. 4, 2001, pp. 139-176.

Thompson, S.C., "Directional Microphone Patterns: They also have disadvantages," Audiology Online, pp. 1-6, Aug. 21, 2000.

* cited by examiner

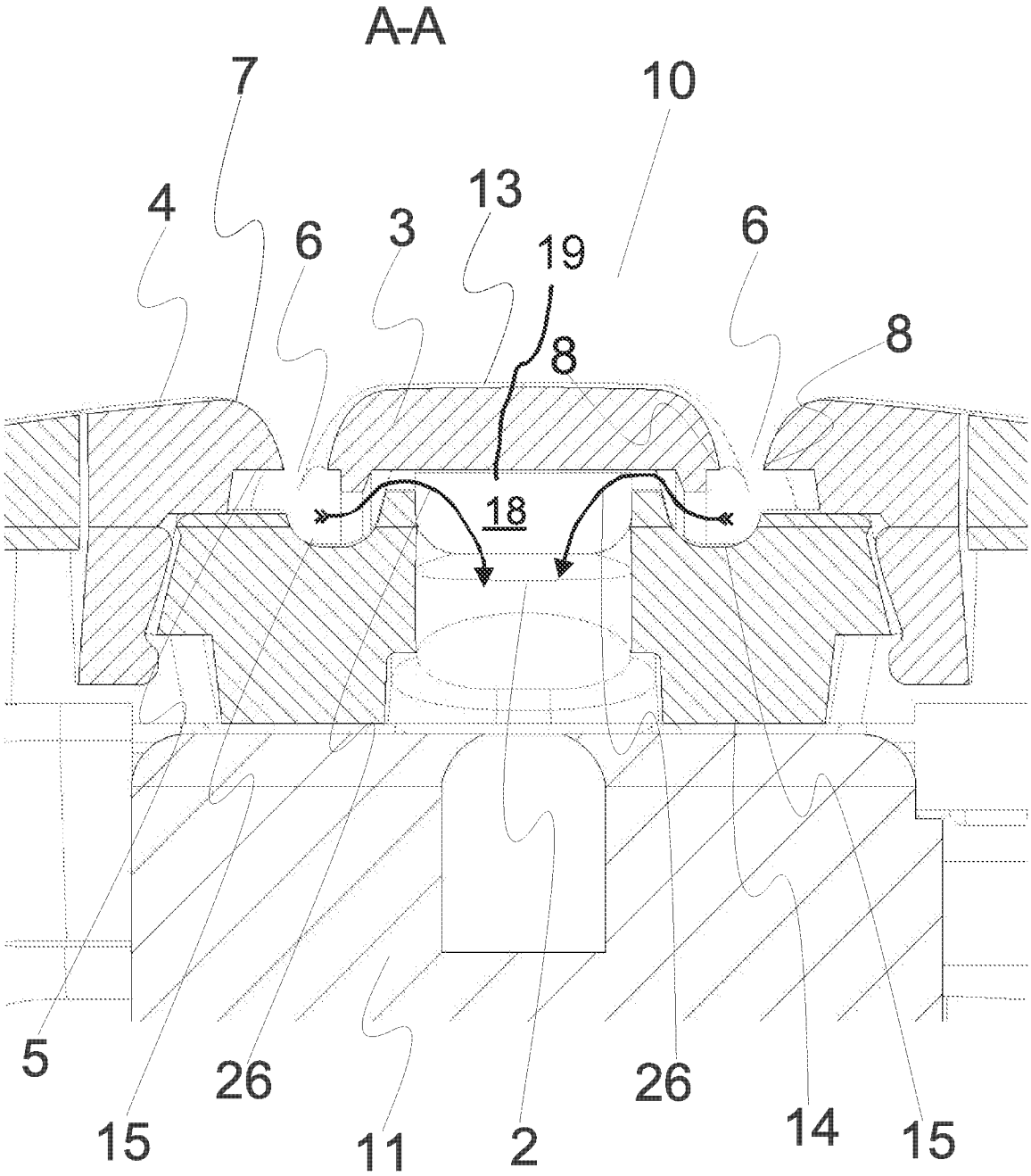
Fig. 1
(Amended)

AUDIO DEVICE COMPRISING A MICROPHONE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application is a Continuation of co-pending application Ser. No. 11/515,802, filed on Sep. 6, 2006, and for which priority is claimed under 35 U.S.C. § 120. This application claims priority of Application No. EP 05108252.7, filed on Sep. 8, 2005 respectively, under 35 U.S.C. § 119; the entire contents of all are hereby incorporated by reference.]

*This Application is a Reissue of U.S. Pat. No. 8,494,204 issued on Jul. 23, 2013, which is a Continuation of U.S. patent application Ser. No. 11/515,802 filed on Sep. 6, 2006 (now U.S. Pat. No. 7,894,621, issued on Feb. 22, 2011), which claims the priority benefit under 35 U.S.C. § 119(a) to Patent Application No. 05108252.7, filed in Europe on Sep. 8, 2005, all of which are hereby expressly incorporated by reference into the present application.*

AREA OF THE INVENTION

The invention relates to the problem of protecting microphone openings. Microphones are very sensitive elements, and they need to be protected from detrimental influence from water and other substances like dust and dirt, which may all cause deterioration of a microphone. Further, it is a big problem with microphones that air moving at velocities above a certain level about the microphone entrance will cause a very annoying sound in the microphone, known as wind noise.

BACKGROUND OF THE INVENTION

A number of different windscreen covers have been tried over time, but none works satisfactorily, and wind noise is still a major disturbance for people who wear hearing aids. Mesh screens have been used, but even if they may dampen wind-noise they have a strong tendency to clog as dirt is inevitably caught and squeezed into the mesh. Also, mesh screens will not keep water out of the microphone opening. Phonak A G has developed a windscreen disclosed in EP 0847227 made of sintered polymer, foamed ceramic, sintered glass or sintered metal. The developed cover is hydrophobic and-or oleo phobic. This prior art cover is with small open pores, whereto a "Teflon®" coating is applied. This cover suffers from the problem that it is not fully sound transparent and also it is rather expensive. None of the prior art techniques seem to provide a microphone cover which both protects the microphone against pollution from the surroundings and diminishes the problems relating to wind-noise in a satisfactory way, while at the same time allows free passage for sound from the surroundings to the microphone element.

SUMMARY OF THE INVENTION

According to the invention an audio device is provided comprising a microphone and a sound canal allowing sound to pass from the surroundings to the microphone, wherein further a signal path from the microphone to a receiver is provided and powered by a current source, such that sounds received at the microphone may be enhanced and presented at the ear level of the user and wherein a protection screen is provided at the sound canal, whereby the screen comprises a first surface which faces the surroundings and a second surface which faces the sound canal whereby the screen has a slit-formed opening between the first surface and the second surface whereby the transition between the first surface and the slit-formed opening is smooth and gradual, and whereby a sharp edge forms the transition between the second surface and the slit-formed opening.

By way of the slit formed opening and the gradual transition from the first even surface and the opening, it is ensured that air moving about over the protection screen will not find any sharp edges and less turbulence will be generated, whereby the wind noise will remain at a minimum level. The sharp edges provided between the second surface and the slit formed opening will ensure that water will have a tendency to form droplets on the first even surface, and such droplets may easily be wiped off or simply left to dry. Thus the protection screen will protect the microphone against wind noise and against water. The slit-formed entrance allows a large opening area without allowing large elements of pollution to enter into the delicate microphones, whereby good sound transparency combined with good protection against pollution is ensured. Further, the gradual transition from the first even surface to the slit, will allow the protection screen to be wiped off and cleaned without dirt elements being squeezed into the opening. Any audio device comprising a sound pick-up element and a sound producing element at the ear may benefit from the invention. Hearing aids, cochlear implants and headsets are obvious examples. In hearing aids and headsets the receiver is a miniature loudspeaker, and in cochlear implants the receiver is an electrode device presenting the sound signal a number of electrical potential differences along an electrode.

In an embodiment of the audio device, two slit formed openings are provided in the surface of the protection screen, with an intermediate plate element between the two slit formed openings and also an opening to a canal leading to a microphone is provided below the intermediate plate element, such that a sound passage is provided from the surroundings, through the slit formed openings, and into the canal leading to the microphone. This gives a further protection of the microphone, because the intermediate plate will prevent direct access from the surroundings and into the microphone canal.

Further the provision of two slit formed openings will aid to secure the audio device against clogged microphone openings, as the audio device will function fine, even if one of the slit formed openings should be clogged as long as the other remains free.

In an embodiment of the invention, two or more canals leading to a microphone or microphones are provided in the area below the intermediate plate element. This allows a directional audio device to be made. The slit formed openings will here allow sounds from all directions to reach the microphone entrances equally well, and this is most important in ensuring good directional characteristic of microphone systems with more openings. Further, the two slit formed openings secure the system against malfunction due to clogging of the sound entrances.

In an embodiment of the invention, the two slit formed openings extends side by side, and the distance between the slit formed openings is such that the below opening, which leads to a microphone canal, is covered by the intermediate plate element. This construction is particularly well suited to keep debris and moisture out of the canals leading to the microphones, as the intermediate plate element will provide a roofing over the microphone openings which serves to keep water and dust out of the microphone canals.

In a further embodiment a space beneath the slit formed openings is provided along the whole length of the openings, such that sound may pass through the slit at any point and reach the microphones. This will enhance the sound transparency of the protection screen further.

The invention also comprises a protection screen for an audio device where the screen has a first surface which faces the surroundings and an opposed second surface which faces an audio device, wherein the first surface is substantially smooth, and wherein a slit formed opening is provided in the screen between the first surface and the second surfaces and wherein the transition between the first surface and the slit formed opening is smooth and gradual, and whereby the transition between the second surface and the slit formed opening is sharp and edge-like. Such a protection screen will be advantageous in that it may provide good protection against both wind noise, and at the same time will prevent moisture and other pollution elements to enter into delicate electronic devices placed below the protection screen.

In an embodiment the protection screen has a slit formed opening with a lengthwise extension allowing two microphone openings in a directional microphone system to be placed along the length of the slit-formed opening. Sound may in such a system enter the slit formed opening at any point and reach either opening of the directional system. This will provide improved directional characteristics of the system.

Preferably the protection screen has two slit formed openings provided side by side and spaced around 3 mm apart, such that an intermediate plate part is formed between the slit formed openings. An intermediate part of this width is suited to cover microphone openings of a directional system, and having the microphone openings placed below the intermediate part, will allow sound to reach the microphones even if one of the slit formed openings should clog.

It is further preferred that the slit formed openings have a width in the range of 0.1 to 0.5 mm. This with will prevent both moisture and dust from entering into the area beneath the screen and at the same time allows sufficient sound transparency of the protection screen. In a preferred embodiment the width is around 0.2 mm.

In an embodiment the sharp edge-like transition between the second surface and the slit formed opening is provided as an edge with a maximum radius of curvature of 0.05 mm. This radius of curvature will prevent droplets of moisture formed at the first surface of the screen to seep from the first to the second surface. This is important as thereby water may be kept out of an audio device equipped with the screen.

BRIEF DESCRIPTION OF THE DRAWINGS

FIG. 1 is a sectional view along line A-A of an audio device with cover plate as shown in FIG. 3.

DESCRIPTION OF A PREFERRED EMBODIMENT

Figure 5:
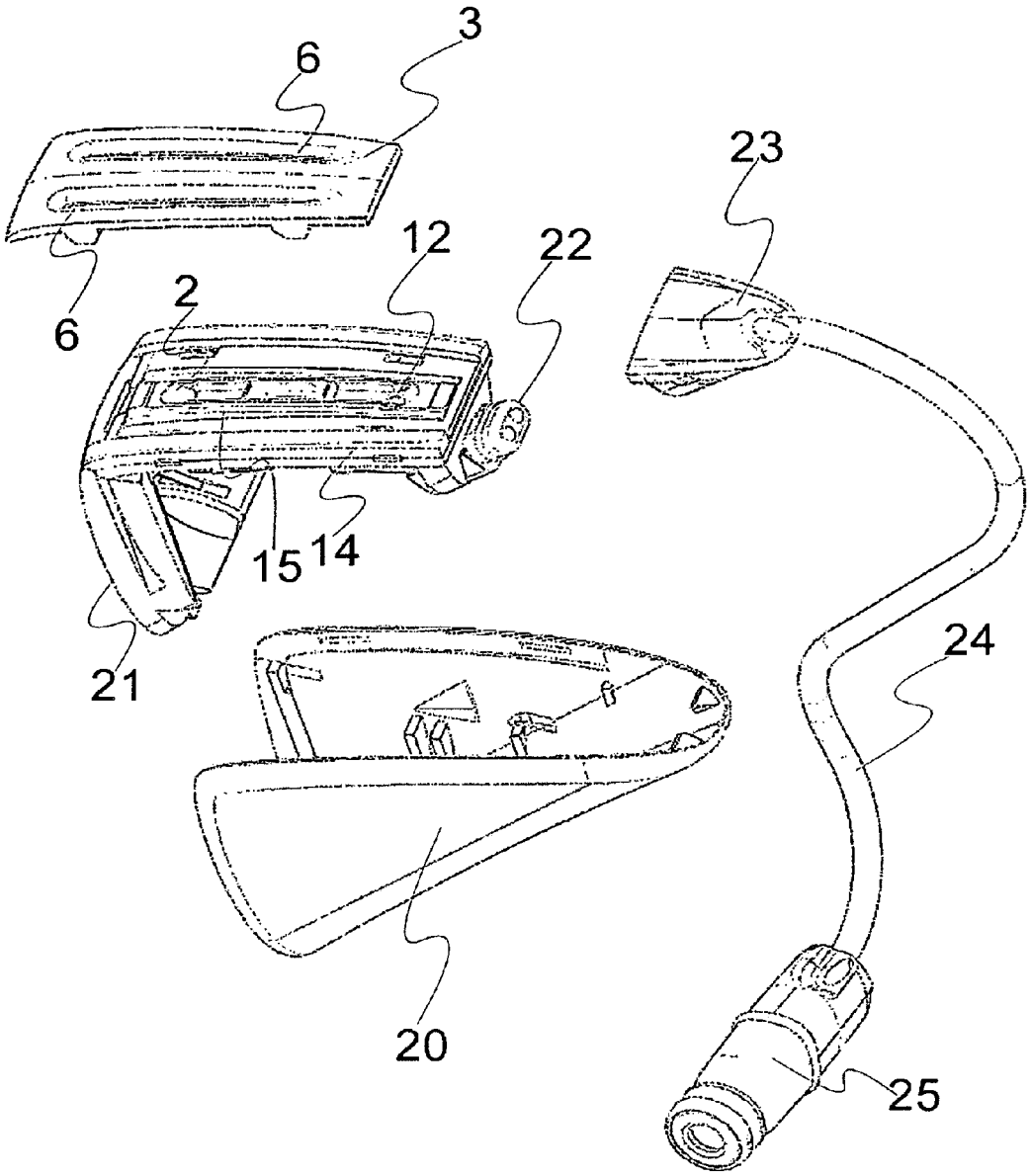
FIG. 5 is an exploded view of the main parts of the audio device.

In the exploded view of FIG. 5 the various parts of the audio device are shown. A generally triangular shell part 20 forms the basis of the device. A chassis 14 is shaped to fit into the shell 20 from a first side and a battery frame 21 fits into a second side of the shell part. The three parts: shell 20, chassis 14 and battery frame 21 are shaped to enclose the electronic parts of the audio device, namely microphones 1, 11 seen in FIGS. 1, 2 and 3 and a print (not shown) with an audio processing device and a battery. Further, a socket 22 is provided for outputting an electric audio signal. A plug 23 fits the socket and leads inside a tube 24 are provided for powering an audio speaker 25. In use, the audio device is placed behind a user's ear, and the speaker 25 is placed inside the ear canal of the user to allow the user to hear enhanced versions of the sound received at the microphones 1,11. A windscreen 3 is further mountable on the chassis 14 to protect the sound entrances 2, 12.

Figure 2:
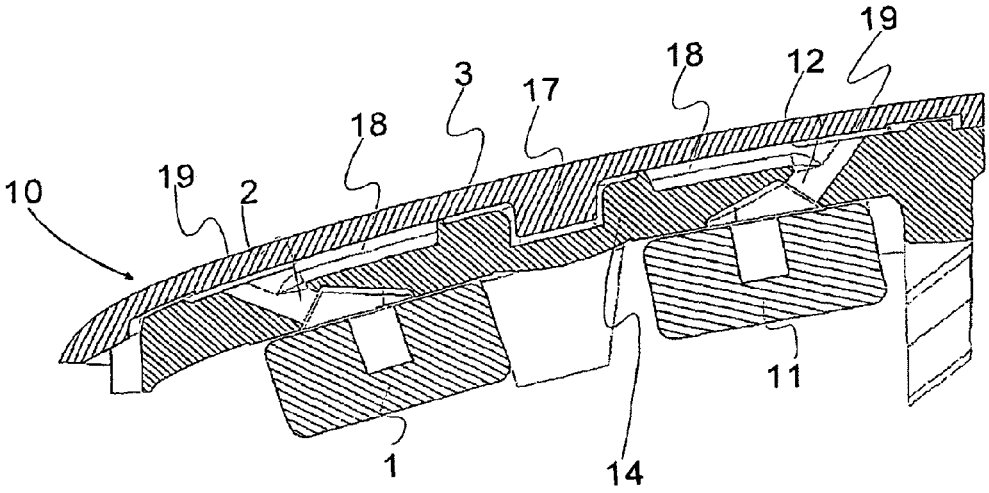
FIG. 2 is a lengthwise sectional view of an audio device according to the invention.
Figure 3:
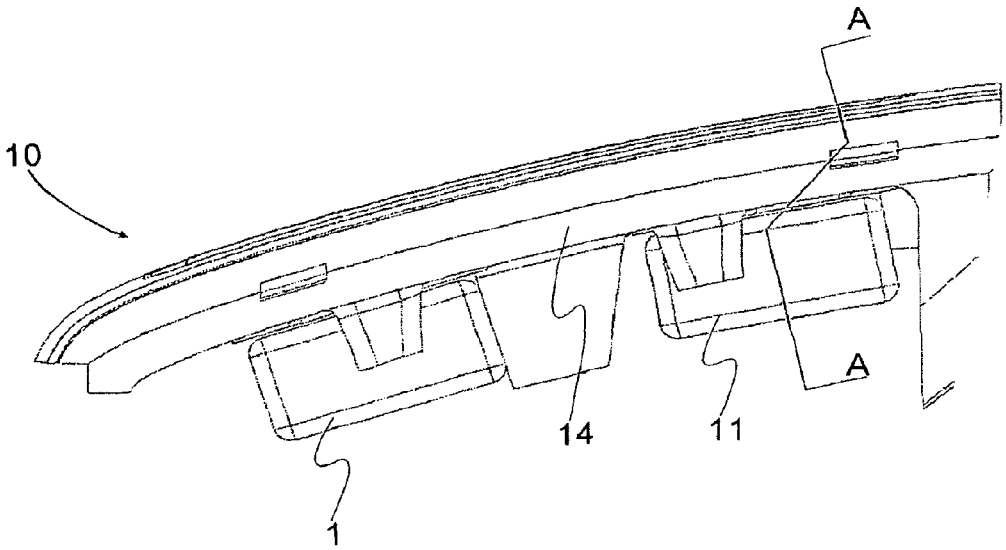
FIG. 3 is a side view.
Figure 4:
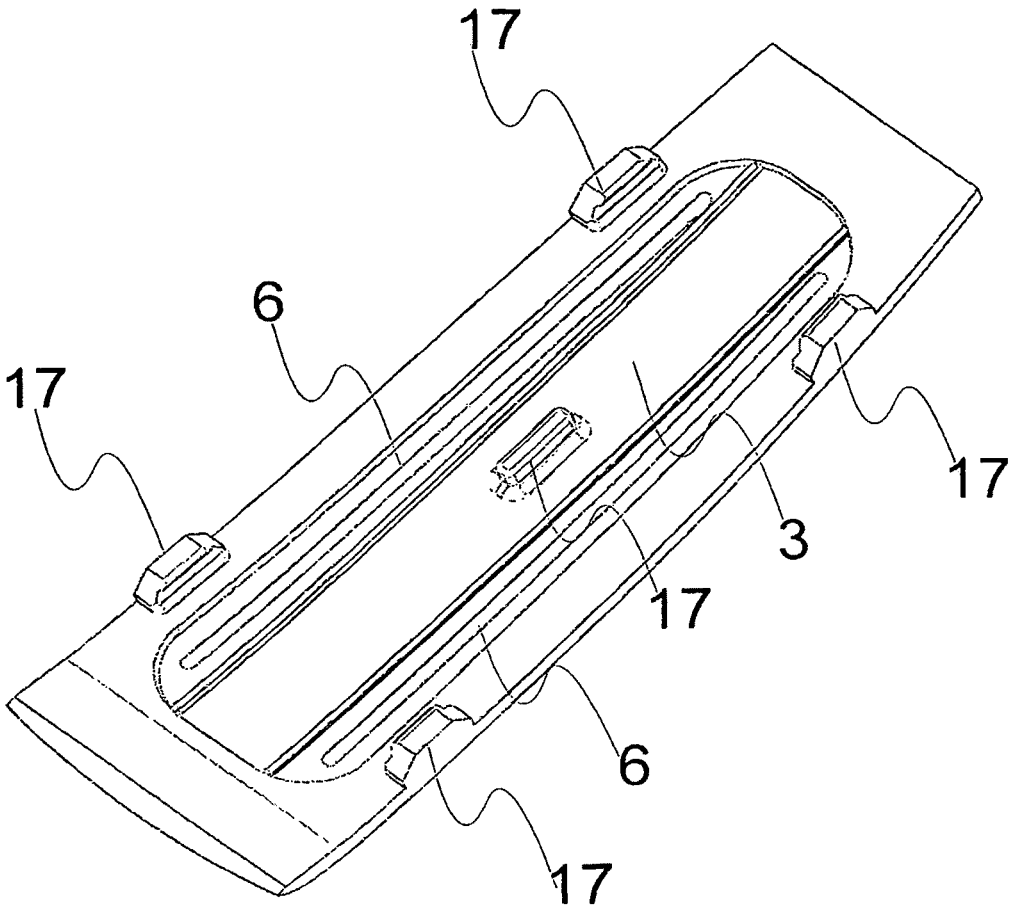
FIG. 4 is a perspective view of the detachable cover seen from below.

In FIG. 2 an embodiment of the invention is shown in section along a length axis of the audio device. FIG. 1 is a sectional view along line A-A of FIG. 3 and thus perpendicular to the view in FIGS. 2 and 3 is shown. As seen the protection screen 3 is provided over sound entrances 2, 12 and protects the entrances from direct impact of wind and other environmental influences. The screen 3 has two slit-formed openings 6 extending along the length of the screen 3 as best seen in FIGS. 1 and 4. The screen 3 has a first surface 4 facing the environment and a second surface 5 facing the inside of the audio device with microphones 1,11. The surface 4 is made even and smooth so that it will be easy to clean and so that no wind noise will result from air passing over the surface 4. Below the screen 3 the sound entrances 2,12 lead through respective canals in the chassis 14 to the microphones 1,11. The slit-formed openings 6 in the screen 3 are provided above furrows 15 in the chassis 14 and from the furrows 15 access is allowed to the sound entrances 2, 12 for the respective microphones 1,11. The furrows 15 and the slit-formed openings 6 together allow sound to reach the microphones 1, 11 from any point above the surface 4.

As seen in FIG. 1 the microphones 1,11 are placed in the centreline of the audio device 10 and the furrows 15 and slit-formed openings 6 extend at each respective side of the centreline. Thus the sound entrances 2,12 are covered by an intermediate part 13 of the screen 3.

Apertures 19 between the screen 3 and the chassis 14 are provided and are best seen in FIG. 1. The apertures 19 connect the furrows 15 at both sides with the sound entrances 2,12. Each sound entrance 2, 12 thus receive sound from both slit formed openings 6 along the paths indicated by arrows 26 in FIG. 1. The audio device will still function even if one of the slit-formed openings 6 becomes clogged.

Resonance chambers 18 are provided in connection with each sound entrance 2,12, between the screen 3 and the chassis 14. As seen in FIG. 2 the chambers 18 are blind holes, and they will aid to dampen certain frequencies in the ultrasound range, and this will make the audio device less sensitive to the detrimental influences of ultrasound used in room sensors and automatic door openers.

As seen in FIG. 1 the transition between the first surface 4 and the opening 6 is made with a smooth and rounded shoulder 7, whereas the transition between the second surface 5 and the opening 6 is made with a sharp edge 8. This ensures both that water is less likely to enter the slit-formed openings 6, and that the openings are easily cleaned by simply running a soft cloth along the length axis of the device. Tests have shown that water will form pearls or droplets on the shoulder 7 rather than enter the openings 6. This is due to the sharp edge 8 between the slit 6 and the second surface 5 and the rounded shape of the shoulder 7 in combination with the surface tension of water. A perfectly sharp edge between the surface 5 and the opening 6 is difficult to realize, and a rounded edge less than 0.05 mm is sufficiently sharp. Tests have further shown that the width of the slit-formed openings 6 should preferably be between 0.1 and 0.3 mm, and in a preferred embodiment the slit is 0.2 mm. This measure is taken at the narrow-most part of the slit. Further, it is important that the angle between the surface 5 and the side-walls of the slits 6 is less than 90 degrees in order that the overall profile of the slit-formed openings 6 becomes v-shaped. This helps to avoid clogging and allows easy cleaning of the wind screen.

Wind noise is known to be a serious problem to especially hearing aid wearers, but through the shape of the screen 3 and the openings 6 and the arrangement of the microphones, it is ensured that wind noise is minimized, and at the same time the screen 3 provides good protection against other environmental influences like moisture and dust. As seen in FIG. 4 the screen has protrusions 17 that enable the screen to be mounted by click connections onto the chassis 14 of the audio device 10.

The invention claimed is:

[1. An audio device, comprising:

an external casing;

a microphone housed within the external casing, acoustically connected through a sound canal to an inlet port of the external casing; and a protective cover attached to the external casing above the inlet port, the protective cover including a first surface facing substantially toward exterior of the audio device, the first surface having a smooth curvature toward an elongated slit opening of the protective cover, and a second surface facing toward interior of the audio device, the second surface meeting the first surface along an edge defining the boundary of the elongated slit opening.]

[2. The audio device according to claim 1, wherein the edge has a cross-sectional angle of less than ninety degrees.]

[3. A protection screen for an audio device, comprising:

a first surface facing substantially toward exterior of the audio device, the first surface having a smooth curvature toward an elongated slit opening; and a second surface facing toward interior of the audio device, the second surface meeting the first surface along an edge.]

[4. The protection screen for an audio device according to claim 3, wherein the audio device includes an exterior casing having at least one microphone inlet, and the elongated slit opening of the protection screen is positioned above the at least one microphone inlet.]

[5. A protection screen for an audio device, comprising:

a first surface facing substantially toward exterior of the audio device, the first surface having a smooth curvature toward an elongated slit opening; and a second surface facing toward interior of the audio device, the second surface meeting the first surface along an edge, wherein the audio device includes an exterior casing having two microphone inlets, the elongated slit opening extends above the two microphone inlets, defining an open space between the protection screen and an upper surface of the casing between the two inlets.]

[6. The protection screen for an audio device according to claim 3, wherein the edge defines the boundary of the elongated slit opening.]

[7. The protection screen for an audio device according to claim 3, wherein the edge has a cross-sectional angle of less than ninety degrees.]

[8. An audio device, comprising:

an external casing including two microphone inlets;

at least one microphone housed within the external casing, acoustically connected through a sound canal to at least one of the two microphone inlets of the external casing; and a protective cover attached to the external casing above the two microphone inlets and defining an open space between itself and the external casing, the protective cover including a first surface facing substantially toward exterior of the audio device, the first surface having a smooth curvature toward an elongated slit opening of the protective cover, a second surface facing toward interior of the audio device, the second surface meeting the first surface along an edge defining the boundary of the elongated slit opening, and the elongated slit opening.]

*9. An audio device, comprising:*

*an external casing including a shell, a chassis shaped to fit into the shell, and a battery frame, the external casing being configured for placement behind an ear of a user and having a plurality of inlet ports;*

*at least two microphones housed within the external casing, each microphone being acoustically connected through a respective sound canal to a respective inlet port of the external casing so as to receive sound from outside the external casing, each microphone being centered within the external casing;*

*the shell, the chassis, and the battery frame being configured to enclose an audio processing device and a battery; and*

*a protective cover attached to the external casing above the inlet ports, the protective cover including*

*two elongated slit openings, the two elongated slit openings are positioned on opposite sides of center of the protective cover,*

*a first surface facing substantially toward the exterior of the audio device, the first surface having smooth curvatures at a transition toward said two elongated slit openings of the protective cover,*

*a second surface facing toward the interior of the audio device, the second surface meeting the first surface along edges defining the boundaries of the two elongated slit openings, and*

*wherein, below the protective cover, the inlet ports lead through respective sound canals in the chassis to the two microphones, and*

*a space beneath the two elongated slit openings is provided under the two elongated slit openings, such that sound may pass through each of the two elongated slit openings at any point and reach each of the microphones.*

*10. The audio device according to claim 9, wherein the edges have a cross-sectional angle of less than ninety degrees.*

*11. An audio device, comprising:*

*a shell being configured for placement behind an ear of a user;*

*a chassis shaped to fit into the shell;*

*two microphones housed within the chassis, the microphones being centered within the chassis; and*

*a protection screen attached to the chassis, the protection screen including,*

*two elongated slit openings, the elongated slit openings being positioned on opposite sides of a center of the protection screen,*

*a first surface facing substantially toward the exterior of the audio device, the first surface having smooth curvatures at a transition toward said two elongated slit openings,*

*a second surface facing toward the interior of the audio device, the second surface meeting the first surface along edges,*

*an intermediate part between the two elongated slit openings,*

*a sound entrance, below the protection screen, acoustically connecting each of the two elongated slit openings with each of the respective microphones, and*

*a space beneath the two elongated slit openings is provided along the entire length of the two elongated slit openings, such that sound may pass through each of the two elongated slit openings at any point and reach each of the microphones.*

*12. The audio device according to claim 11, wherein*

*the shell has at least one microphone inlet, and*

*the two elongated slit openings of the protection screen are positioned above the at least one microphone inlet.*

*13. The audio device according to claim 11, wherein the edges define the boundaries of said two elongated slit openings.*

*14. The audio device according to claim 11, wherein the edges have a cross-sectional angle of less than ninety degrees.*

*15. An audio device, comprising:*

*an external casing including two microphone inlets, the external casing including a shell and a chassis, the external casing being configured for placement behind an ear of a user;*

*at least two microphones housed within the external casing, acoustically connected through a sound canal to at least one of the two microphone inlets of the external casing;*

*at least two sound canals allowing sound to pass to the microphones;*

*a signal path from the microphones to a speaker, such that sounds received at the microphones is enhanced and presented at the ear of the user;*

*a protective cover attached to the external casing above the two microphone inlets and defining an open space between itself and the external casing, the protective cover including*

*an elongated slit opening, said elongated slit opening having a length measurement that is larger than a width measurement*

*a first surface facing substantially toward the exterior of the audio device, the first surface having a smooth curvature at a transition toward said elongated slit opening of the protective cover,*

*a second surface facing toward the interior of the audio device, the second surface meeting the first surface along an edge defining the boundary of the elongated slit opening,*

*a space beneath the elongated slit opening provided along a length of the elongated slit opening, such that sound may pass through the elongated slit opening located at any point on the protective cover to reach each of the microphones;*

*an aperture between the protective cover and the chassis; and*

*a sound entrance below the aperture and above one of the microphones.*

* * * * *